United States Patent [19]
Pinciaro

[11] Patent Number: 5,850,640
[45] Date of Patent: Dec. 22, 1998

[54] HYDROTHERAPY JET AND FIXTURES FOR SPA TUBS AND POOLS AND A METHOD OF INSTALLATION

[76] Inventor: John Pinciaro, 451 Moose Hill Rd., Monroe, Conn. 06468

[21] Appl. No.: 682,432

[22] Filed: Jul. 17, 1996

[51] Int. Cl.⁶ .............................................. A61H 33/04
[52] U.S. Cl. ...................................... 4/541.6; 285/139.2
[58] Field of Search .................. 4/541.1–541.6, 4/252.5, 252.6; 277/178, 212 C; 285/139.2, 140.1, 141.1, 162; 152/427

[56] References Cited

U.S. PATENT DOCUMENTS

| | | | |
|---|---|---|---|
| D. 318,900 | 8/1991 | Zarinfar | D23/213 |
| 3,434,746 | 3/1969 | Watts | 285/162 |
| 3,953,555 | 4/1976 | Gley | 285/140.1 X |
| 4,261,347 | 4/1981 | Spencer, III | 128/66 |
| 4,359,790 | 11/1982 | Chalberg | 4/541 |
| 4,419,775 | 12/1983 | Ebert | 4/542 |
| 4,420,846 | 12/1983 | Bonner | 4/542 |
| 4,460,519 | 7/1984 | Leggett | 261/76 |
| 4,475,578 | 10/1984 | Nidle | 285/140.1 X |
| 4,544,996 | 10/1985 | George | 362/238 |
| 4,553,299 | 11/1985 | Ebert | 29/157 |
| 4,581,781 | 4/1986 | Ebert | 4/542 |
| 4,592,100 | 6/1986 | Robertson et al. | 4/492 |
| 4,613,169 | 9/1986 | Engelhart | 285/161 |
| 4,715,071 | 12/1987 | Henkin et al. | 4/542 |
| 4,731,887 | 3/1988 | Henkin et al. | 4/541 |
| 4,782,430 | 11/1988 | Robbins et al. | 362/32 |
| 4,797,958 | 1/1989 | Guzzini | 4/542 |
| 4,853,987 | 8/1989 | Jaworski | 4/542 |
| 4,858,255 | 8/1989 | Haisman | 4/544 |
| 4,982,459 | 1/1991 | Henkin et al. | 4/541 |
| 5,014,372 | 5/1991 | Thrasher et al. | 4/542 |
| 5,029,879 | 7/1991 | Strang, Sr. et al. | 277/178 |
| 5,045,978 | 9/1991 | Gargle | 362/101 |
| 5,056,168 | 10/1991 | Mersmann | 4/541.6 |
| 5,058,220 | 10/1991 | Mikiya | 4/542 |
| 5,076,500 | 12/1991 | Daniels | 239/587 |
| 5,207,499 | 5/1993 | Vajda et al. | 362/96 |
| 5,217,292 | 6/1993 | Chalberg | 362/96 |
| 5,245,714 | 9/1993 | Haraga et al. | 4/542 |
| 5,265,286 | 11/1993 | Filipponi | 4/541 |
| 5,291,621 | 3/1994 | Mathis | 4/541.4 |
| 5,335,276 | 8/1994 | Kaldewei | 4/541.6 |
| 5,353,447 | 10/1994 | Gravatt | 4/541.6 |
| 5,495,627 | 3/1996 | Leaverton et al. | 4/541.6 |

*Primary Examiner*—Charles E. Phillips
*Attorney, Agent, or Firm*—David P. Gordon; David S. Jacobson; Thomas A. Gallagher

[57] ABSTRACT

A hydrotherapy jet assembly includes a resilient grommet and a jet valve body. The grommet has a lip, a body having an inner surface and an outer surface, and a raised bead running the inner surface circumference. The inner surface includes a tapered portion tapering away from the lip. The jet valve body has a water entry port, an air conduit, a lip, and an external circumferential groove for interlocking with the raised bead of the grommet, and a water fitting. According to a method of the invention, the grommet is inserted from the inside of the tub through a hole drilled in a tub wall until the lip of the grommet seats flush with the tub wall. The jet valve body is inserted from the inside of tub until the bead of the grommet interlocks with the groove of the jet valve body and the lip of the jet valve body abuts the lip of the grommet. With this design and method of installation no back grinding is required of the drilled hole and no other sealant, such as a gasket, caulking, or o-ring, is required for installation. The entire installation may be completed by one person. Other embodiments of the hydrotherapy jet assembly and of other tub and pool fixtures are also provided.

12 Claims, 12 Drawing Sheets

HYDROTHERAPY JET AND FIXTURES FOR SPA TUBS AND POOLS AND A METHOD OF INSTALLATION

BACKGROUND OF THE INVENTION

1. Field of the Invention

This invention relates broadly to spa tub and pool fixtures. More particularly, this invention relates to spa tub and pool fixtures especially of a hydrotherapy jet system type which are easily and quickly installable.

2. State of the Art

Spa tubs are generally relatively deep vacuum formed tubs having a smooth acrylic interior surface and a relatively rougher fiberglass back. The tubs are provided with a number of fixtures including water jet assemblies. The appeal of a spa tub is primarily due to the hydrotherapy provided by the number of pressurized water jets recessed into the tub wall which provide a massaging action.

In particular, each hydrotherapy jet assembly is connected to a pressurized water supply and an air supply. The pressurized water flows through a hydrotherapy jet assembly having an expanded nozzle. As the water flows through the expanded nozzle, the water at the center of the nozzle moves more rapidly than the water along the sides of the nozzle. As a result, a low pressure area is created at the center of the nozzle. Air is drawn from an inlet into the low pressure area and mixes with the water. The mixture of pressurized water and air thereby provide an aerated therapeutic jet of water.

Well-known hydrotherapy jet assembly fixtures (i.e., those available from Jacuzzi Bros.) generally include four components: a wall fitting, a gasket, a jet valve body, and caulk. A first step in installing a jet assembly is drilling a hole in the tub wall from the inside of the tub through to the back of the tub at the desired location of the fixture. Next the back of the tub surround the drill site must be ground smooth, flat, and parallel to the interior of the tub. This grinding is done by eye and introduces a margin for potential error into the installation. The gasket is placed onto the wall fitting, and the wall fitting is inserted through the drill hole from the interior of the tub, such that the gasket is between the wall fitting and the interior surface of the tub. The jet valve body is then attached to the portion of the wall fitting exiting the back of the tub. However, the tubs are relatively deep. Therefore, two persons are required to install the fixture in the tub. One person holds the wall fitting stationary from the interior of the tub, while the other person threads the jet valve body onto the wall fitting from the back of the tub such that the wall fitting and the jet valve body sandwich the tub wall. A bead of caulk seals the jet valve body to the back of the tub wall. The jet assembly is then connected to a water conduit and an air conduit.

This method of installation using the available hydrotherapy jet fixtures is cumbersome and inefficient primarily because it requires two persons to install.

Similar problems are faced when installing other fixtures into the wall of a spa tub or a pool, as they are often installed in a manner similar to the hydrotherapy jet fixture. The prior art requires a substantial amount of skill to properly install the fixtures.

SUMMARY OF THE INVENTION

It is therefore an object of the invention to provide a tub or pool fixture assembly which is easy to install.

It is another object of the invention to provide a tub or pool fixture assembly which does not require significant skill to install.

It is a further object of the invention to provide a tub or pool fixture assembly which has a smaller potential margin for error on installation.

It is an additional object of the invention to provide a tub or pool fixture assembly which can be installed by a single person.

It is also an object of the invention to provide a tub or pool fixture assembly which has fewer components.

It is still another object of the invention to provide a tub or pool fixture assembly which is reliable.

It is still a further object of the invention to provide a tub or pool fixture assembly which does not require the use of sealants, adhesives, or o-rings.

In accord with these objects which will be discussed in detail below, a tub or pool fixture assembly is provided which has fewer component parts and which can, in most embodiments, be installed into a tub wall entirely from the interior of the tub and in fewer installation steps than the prior art.

According to one embodiment of the invention, a hydrotherapy jet assembly includes a resilient grommet and a jet valve body. The grommet has a lip, a body having an inner surface and an outer surface, and a raised bead running the inner surface circumference. The inner surface includes a tapered portion tapering away from the lip. The jet valve body has a water entry port, an air conduit, a lip, and an external circumferential groove for interlocking with the raised bead of the grommet, and a water fitting. According to a method of the invention, the grommet is inserted from the inside of the tub through a hole drilled in a tub wall until the lip of the grommet seats flush with the tub wall. The jet valve body is inserted from the inside of tub until the bead of the grommet interlocks with the groove of the jet valve body and the lip of the jet valve body abuts the lip of the grommet. With this design and method of installation no back grinding is required of the drilled hole and no other sealant, such as a gasket, caulking, or o-ring, is required for installation.

According to another embodiment of the invention, the assembly includes a grommet with a raised bead and a tapered inner surface, a jet valve body having a circumferential groove for engaging the grommet and a water entry port, a water fitting, and a second grommet for coupling the water entry port and the water fitting. The jet valve body further includes an air conduit for coupling to an air supply.

Other embodiments of the hydrotherapy jet of the invention are also provided. It will be appreciated that the grommet and fixture system of the invention can be used for other tub and pool fixtures, including but not limited to, suction fittings, air control fittings, power switches, skim filters, and lighting fixtures, as disclosed herein.

With each of above embodiments it will be further appreciated that a system is provided which permits easy installation into a tub wall and requires fewer component parts. Most importantly, the installation of each embodiment may be completed by one person. From the foregoing it will also be appreciated that the methods and apparatus are readily adaptable for robotic assembly.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
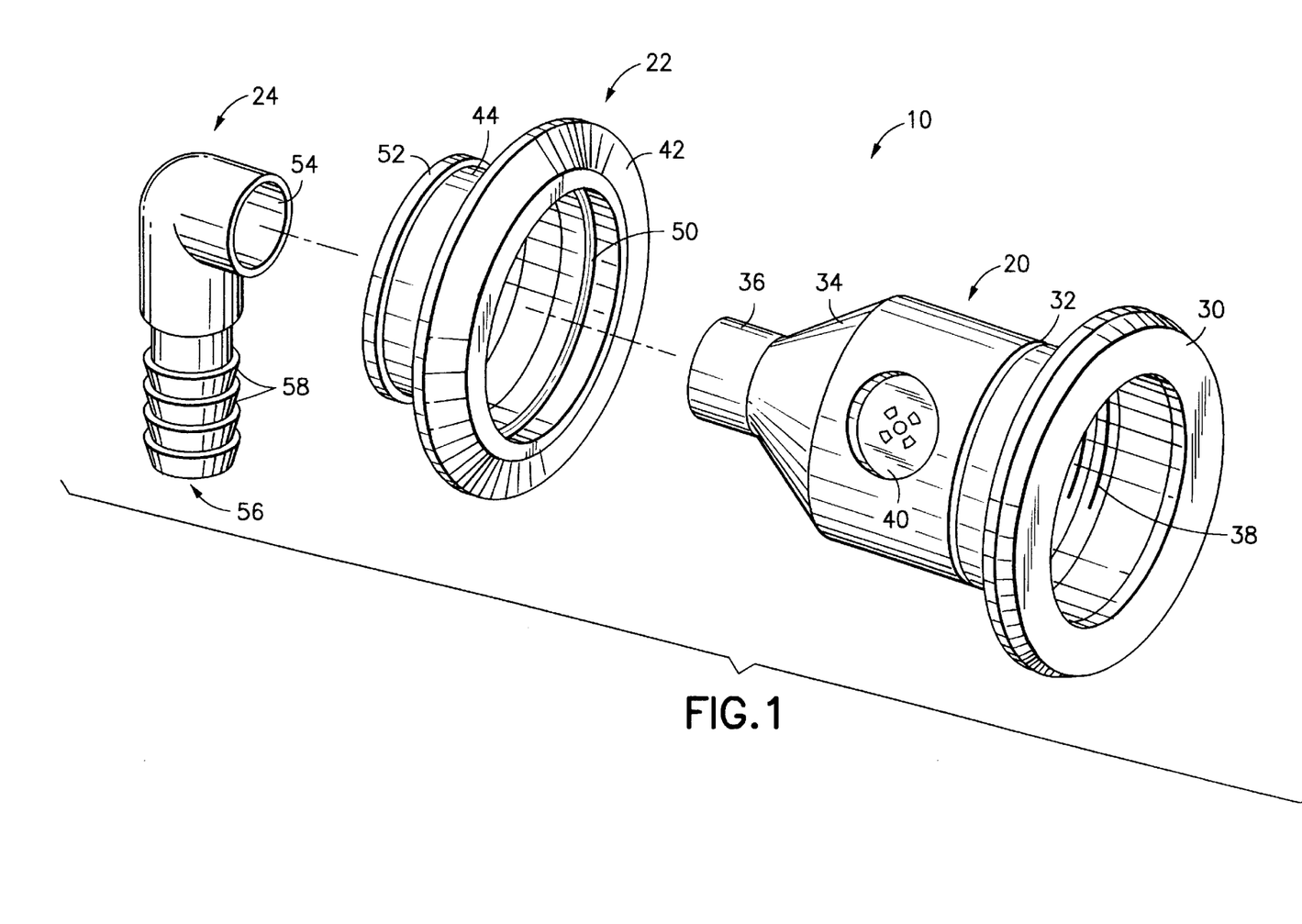
FIG. 1 is an exploded perspective view of a first embodiment of a tub fixture assembly according to the invention.
Figure 2:
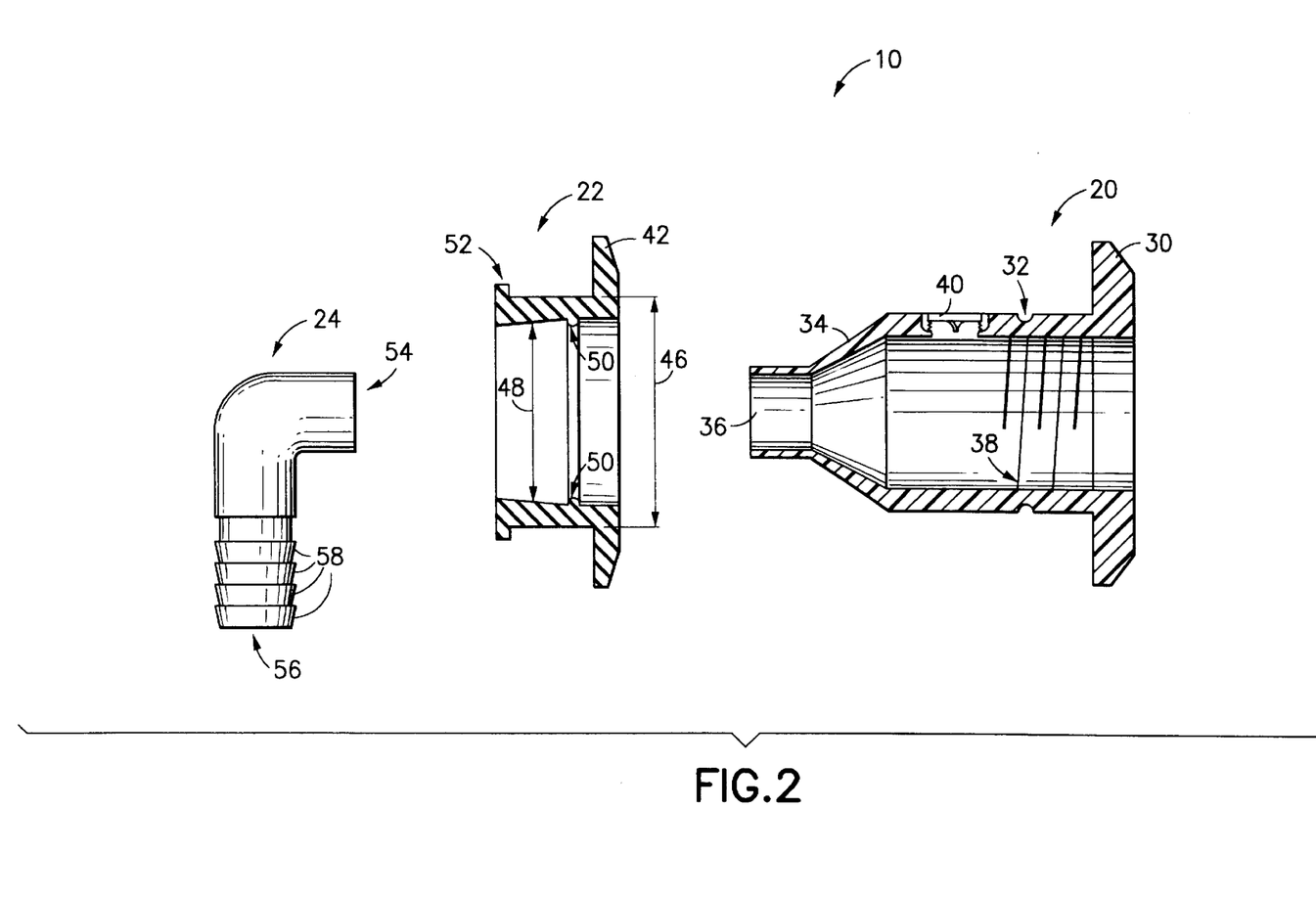
FIG. 2 is an exploded side elevation view in partial section of the embodiment of FIG. 1.
Figure 3:
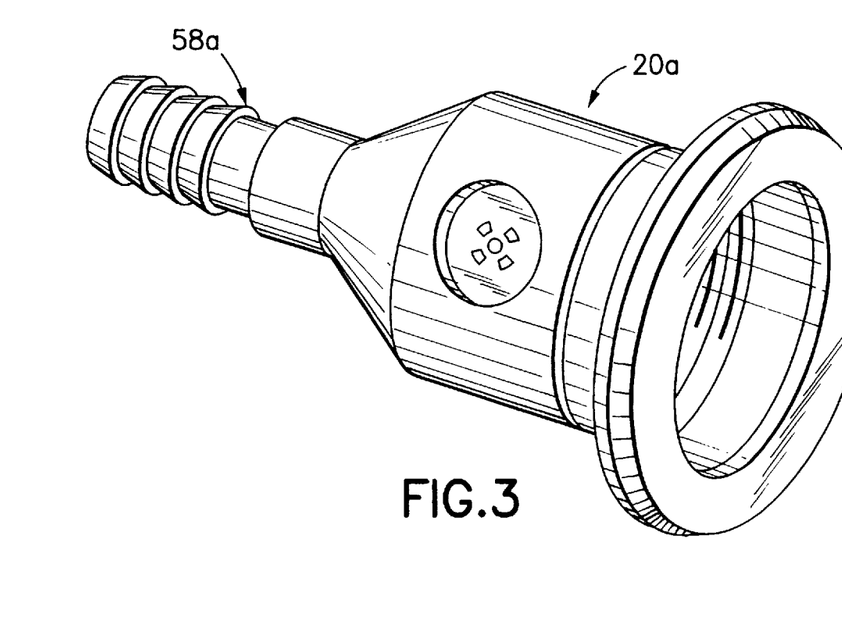
FIG. 3 is a perspective view of a second embodiment of a tub fixture assembly according to the invention.

Turning now to FIGS. 1 and 2, a tub fixture in the form of a hydrotherapy jet assembly 10 is shown. The hydrotherapy jet assembly 10 generally includes a jet valve body 20, a wall grommet 22, and a water fitting 24. The jet valve body 20, preferably made from #40 PVC, is a hollow cylinder having a front lip 30, an external circumferential groove 32, and a frustoconical portion 34 tapering to a water entry port 36. The interior of the body has threads 38 engageable by a jet insert (not shown). The body further includes an air check valve 40 which is biased closed. The wall grommet 22 is a resilient, rubber-like material and includes a body 44, a front lip 42, and a rear flange 52. Rearward of the front lip 42, the body 44 preferably has a substantially constant outer diameter 46 and a rearward tapering inner diameter 48. The body 44 is also provided with a raised bead 50 running the inner circumference. The water fitting 24, preferably made from #40 PVC, is an elbow joint for coupling the jet valve body 20 to a water supply hose. The outlet 54 of the fitting 24 is sized to fit securely over the water entry port 36 of the jet valve body 20. The rear 56 of the fitting 24 is preferably provided with a plurality of barbs 58 for frictionally fitting with the water supply hose (not shown). Referring to FIG. 3, in a second embodiment of the invention, the jet valve body 20a is provided with a plurality of beveled ridges 58a for frictionally fitting with the water supply hose, eliminating the need for the water fitting 24.

Figure 4:
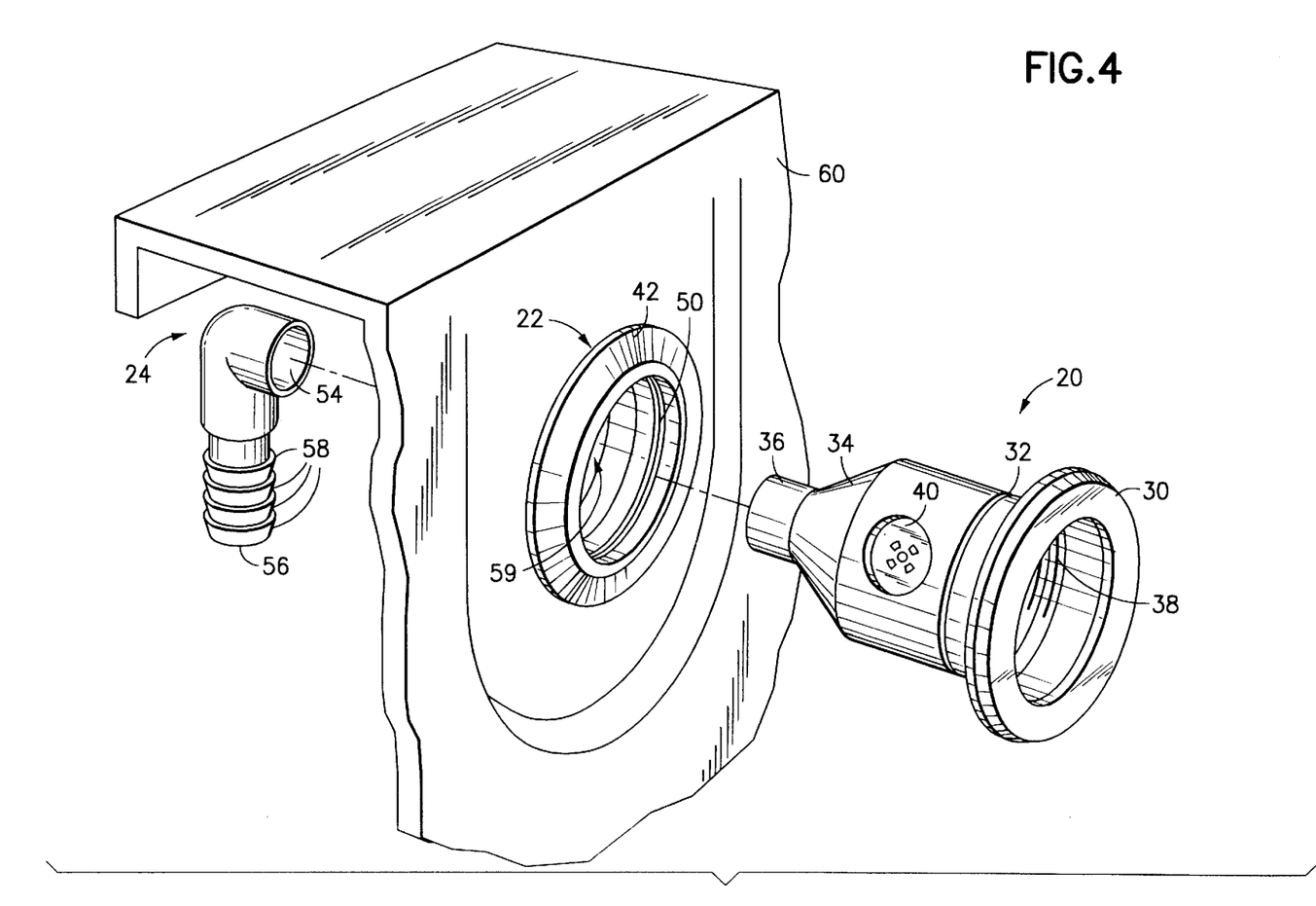
FIG. 4 is an exploded perspective view illustrating the method of installing the first embodiment of a tub fixture assembly according to the invention.

Turning to FIG. 4, the hydrotherapy jet assembly 10 is installed as follows. A hole 59, approximately the size of the outer diameter 46 of the wall grommet 22, is drilled into a tub wall 60. From the inside of the tub, and without first grinding back the fiberglass backing, the wall grommet is seated into the hole such that the rear flange 52 passes through the tub wall. Optionally, a small amount of lubricant, e.g., soapy water, is coated over the inner opening of the wall grommet. The lubricant is chosen to be one that will not breakdown the material of the wall grommet or the jet valve body. The jet valve body 20 is pushed through the wall grommet until the groove 32 on the jet valve body interlocks with the bead 50 on the wall grommet. When the jet valve body is fully seated the front lip 30 of the jet valve body will preferably completely cover the front lip 48 of the wall grommet. It is not necessary to apply caulking to the wall grommet to create a watertight seal as the insertion of the jet valve body into the wall grommet will compress the wall grommet and automatically create a watertight seal. Once the jet valve body is installed in the wall grommet, the check valve 40 is located on the back side of the tub wall 60. The check valve is able to draw air in from the cavity surrounding the tub without requiring connection to a separate air supply. The tub with jet bodies installed is maneuvered into the installation site. The rear 56 of the water fitting 24 is inserted into a water supply hose of the water supply (not shown). The outlet 54 of the water fitting is secured to the water entry port 36 by gluing, otherwise sealing, or by the use of a coupling grommet, as described below with reference to the third embodiment.

From the foregoing, it will be appreciated that water flows from the water supply through the water fitting 24 and into the water entry port 36 of the jet valve body 20. As the water expands from the relatively narrow water entry port through the frustoconical portion and out the cylindrical body, the water at the center section of the body flows at a higher velocity and creates a pressure differential, such that a vacuum is formed. During operation, sufficient vacuum force inside the jet valve body will open the air check valve and permit air to enter. The air mixes with the water and creates a therapeutic jet. As is known in the art, the jet can be controlled by the use of a jet nozzle insert (not shown) inserted into the jet valve body, which directs and moderates the flow of the jet. It will be further appreciated that the lip of the jet valve body prevents the jet valve body from axially reacting to the force of the water jet and moving through the wall grommet. In fact, the force of the water jet will assist in maintaining a flush fit between the lip of the jet valve body and the lip of the wall grommet. Additionally, it will be appreciated that the bead and groove interlock also prevent axial movement of the jet valve body relative to the wall grommet.

It will be appreciated that fewer components are required for the spa jet assembly of the invention. It will also be appreciated that installation of the jet assembly of the invention into the tub requires fewer steps than the jet assemblies of the prior art. Moreover, no sealant, such as a gasket, caulking, or o-ring, is required for installation.

It will be further appreciated that installation of the hydrotherapy jet assembly into the tub is managed by a single person. One person may drill the hole, insert the wall grommet into the tub wall and insert the jet valve body through the wall grommet. From the foregoing discussion those skilled in the art will also appreciate that the methods and apparatus are easily adaptable for robotic assembly. A robotic arm facing the interior of the tub or pool could be programmed to cut a hole in the tub, to then rotate, e.g. 120°, insert a grommet, and then rotate again and insert the jet valve body.

Figure 5:
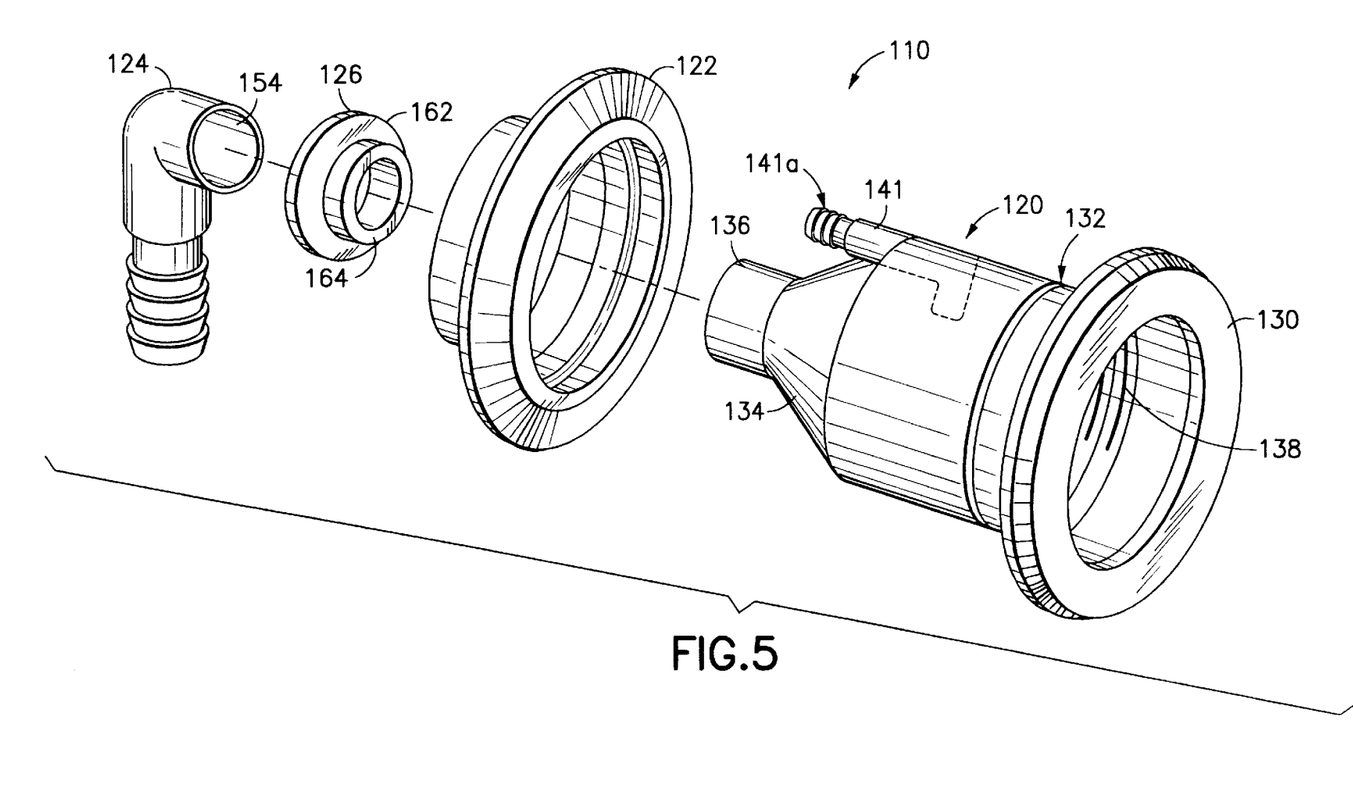
FIG. 5 is an exploded perspective view of a third embodiment of a tub fixture assembly according to the invention.
Figure 6:
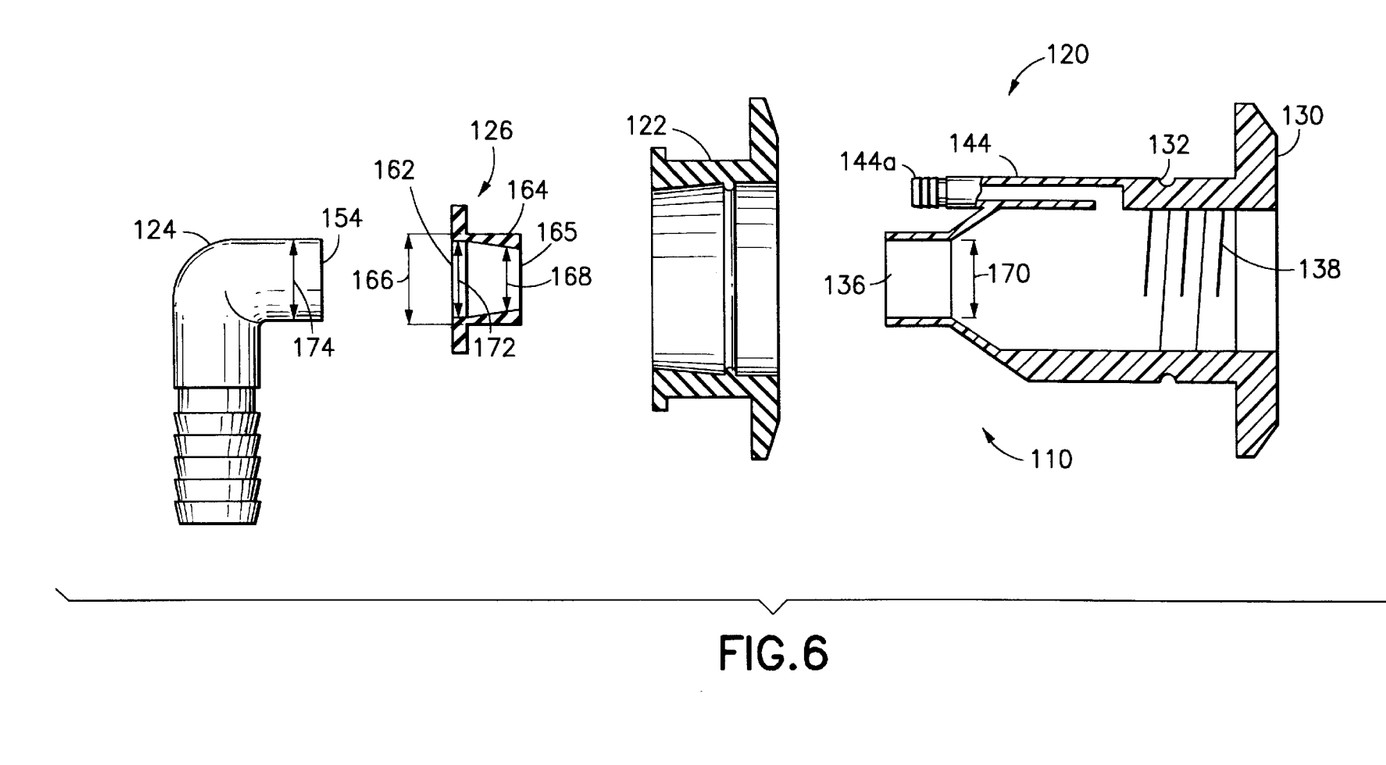
FIG. 6 is an exploded side elevation view in partial section of the third embodiment of a tub fixture jet assembly according to the invention.

Referring to FIGS. 5 and 6, a third embodiment of a hydrotherapy jet assembly fixture 110, substantially similar to the first (with similar parts having numbers increased by 100), is shown. The hydrotherapy jet assembly fixture 110 includes a jet valve body 120, a resilient wall grommet 122, a water fitting 124, and a resilient coupling grommet 126. The jet valve body 120 is a hollow cylinder having a front lip 130, an external circumferential groove 132, and a frustoconical portion 134 tapering to a water entry port 136. The interior of the body has threads 138 engageable by a jet insert (not shown). The jet valve body further includes an internal air conduit 141 contained within the outer diameter of the jet valve body. The air conduit 141 exits the jet valve body perpendicular to the plane of the lip 130 and parallel to the longitudinal axis of the water entry port 136. The air conduit 141 is preferably provided with a barbed connector 141a for coupling to the air supply hose. The wall grommet 122 and water fitting 124 are the same as described with reference to the first embodiment. The coupling grommet 126 includes a body 164 having a outlet 165 at one end and a mouth 162 at the other end. The body 164 has a substantially constant outer diameter 166 and an inner diameter 168 tapering from the mouth 162 towards the outlet 165. The outer diameter 166 is substantially the same as the inner diameter 170 of the water entry port 136. The inner diameter 172 of the body 164 at the mouth 162 is substantially the same as the outer diameter 174 of the outlet 154 of the water fitting 124.

Installing the jet assembly of the third embodiment is substantially similar to installing the jet assembly of the first embodiment with two exceptions. First, after the jet valve body 120 is installed in the wall grommet 122, the water fitting 124 is coupled to the water entry port 136 by the coupling grommet 126. The outlet 165 of the coupling grommet is inserted into the water entry port 136 such that the mouth 162 abuts the water entry port and prevents further passage of the coupling grommet into the water entry port. The outlet 124 of the water fitting is then pushed through the coupling grommet. A small amount of lubricant may be applied to the interior surface of the coupling grommet to assist insertion of the outlet in to the coupling grommet. The water fitting will compress the inner walls of the body of the coupling grommet so that the outer walls of the body provide compressive force to the water entry port, thereby securely coupling the water fitting to the jet valve body. Using the coupling grommet enables a secure watertight coupling without the use of a messy glue or other sealant, without necessitating a time period for a glue or sealant to set, and further provides a coupling which can be uncoupled. Second, the air conduit is coupled to an air supply hose. One advantage of providing a conduit to an air supply hose is that the flow of air to each jet valve body in the tub can be individually controlled, i.e., through the use of a manifold at the air supply.

Figure 7:
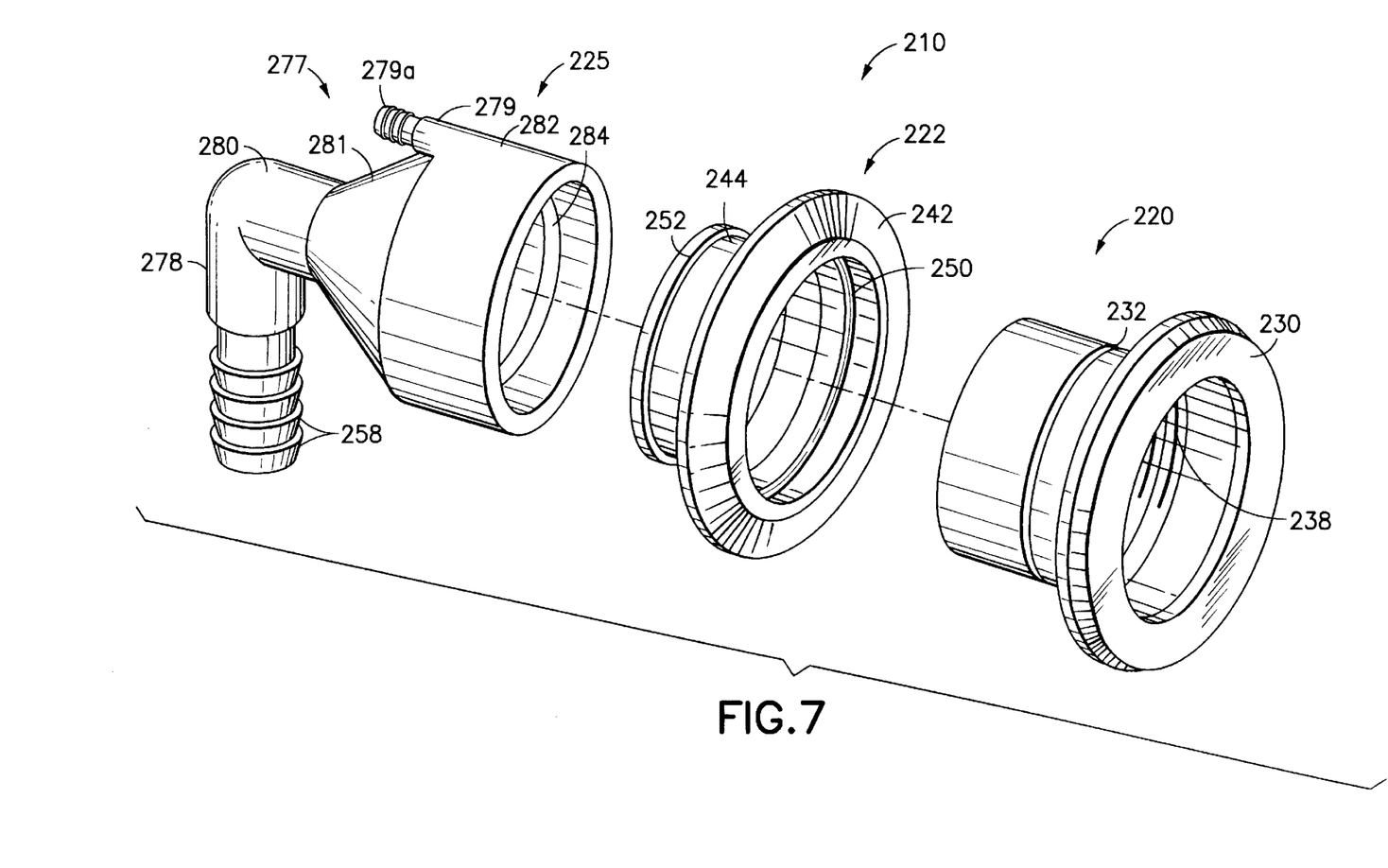
FIG. 7 is an exploded perspective view of a fourth embodiment of a tub fixture assembly according to the invention.

Turning to FIG. 7, a fourth embodiment of a hydrotherapy jet assembly 210, substantially similar to the first (with similar parts having numbers increased by 200), is shown. The hydrotherapy jet assembly 210 includes a jet valve body 220, a two-way wall grommet 222, and a nozzle coupling 225. The jet valve body 220 is a hollow cylinder having a front lip 230, an external circumferential groove 232, and internal threads 238 engageable by a jet insert (not shown). The wall grommet 222 includes a body portion 244 and a front lip 242. The body portion 244 is provided with an internal circumferential raised bead 250 and an external circumferential raised bead 252. Rearward of the front lip 242, the body portion 244 preferably has a substantially constant outer diameter and a rearward tapering inner diameter. The nozzle coupling 225 is a hollow component including a nozzle portion 277, a water fitting portion 278 and an air conduit portion 279. The water fitting portion is preferably provided with a plurality of barbs 258 for frictionally coupling with a water supply hose (not shown). The air conduit portion is preferably provided with a plurality of barbs 279a for frictionally coupling with an air supply hose (not shown). The nozzle portion 277 includes a relatively narrow tubular portion 280, a frustoconical portion 281, and a wider tubular portion or mouth portion 282. The mouth portion 282 includes an interior circumferential groove 284. The inner diameter of the mouth portion is substantially the same as the outer diameter of the body portion of the wall grommet.

The jet assembly is installed as follows. Once a hole has been drilled into the tub wall, the two-way wall grommet is seated therein from the inside of the tub. The mouth portion of the nozzle coupling is pushed over the body of the wall grommet from the back of the tub until the external raised bead 252 of the wall grommet interlocks with the interior groove 282 of the mouth 276 of the nozzle coupling. The jet valve body is then pushed through the wall grommet from the inside of the tub until the lip 230 of the jet valve body is flush with the front lip 242 of the wall grommet and the interior raised bead 250 of the wall grommet interlocks with the external groove 232 on the jet valve body. It will be appreciated that once the jet valve body is forced through the wall grommet, the jet valve body applies compressive force to the wall grommet and the wall grommet, in turn, places compressive force on the nozzle coupling, such that the jet valve body, the wall grommet, the nozzle coupling, and the tub wall are coupled in a watertight arrangement. Thereafter the water conduit is coupled to a water supply hose and the air conduit is coupled to an air supply hose.

It will be further appreciated that as water flows through the narrow tubular portion 280 and enters the frustoconical portion 281, the water will expand creating a vacuum which draws air in through the air conduit 241. Hence, the third embodiment operates as the first embodiment with the exception that the first embodiment includes the nozzle and means for conveying air in the jet valve body and the water conduit in a water fitting, and the third embodiment includes the nozzle, the water conduit, and means for conveying air in a nozzle coupling.

Figure 8:
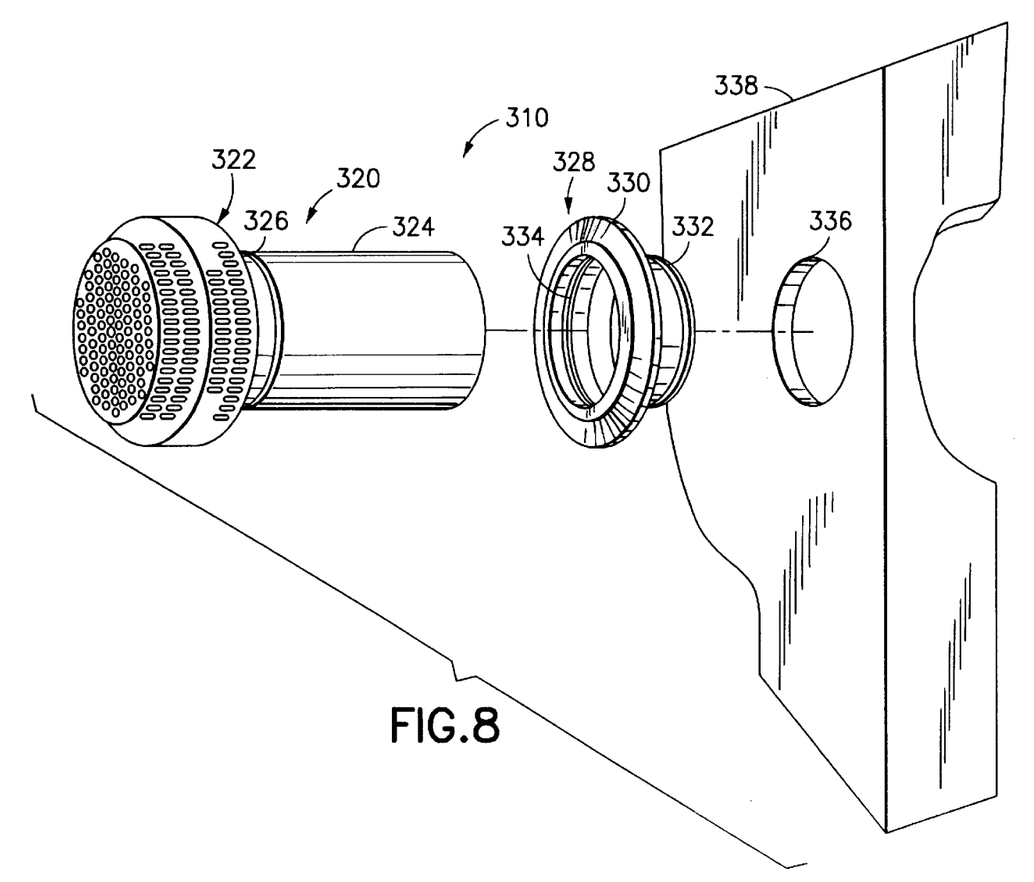
FIG. 8 is an exploded perspective view of a fifth embodiment of a tub fixture assembly according to the invention.

Other embodiments of spa, tub and pool fixtures are also possible utilizing a wall grommet and a fixture body inserted therethrough to easily create a watertight seal. Referring to FIG. 8, a suction fitting assembly 310 is shown. The suction fitting assembly includes a cylindrical suction fitting 320 having a lip 322 and a body 324 provided with an external circumferential groove 326. The assembly further includes a round wall grommet 328 having a lip 330 and a body portion 332. The body portion 332 is provided with an internal circumferential raised bead 334. The wall grommet is inserted through a hole 336 in a spa, tub or pool wall 338 until the lip 330 is flush with the wall. The suction fitting 320 is inserted through the wall grommet 328 until the bead 334 interlocks with the groove 326, at which the lip 322 of the suction fitting is flush with the lip of the wall grommet 330. A watertight seal is formed between the suction fitting and the wall grommet.

Figure 9:
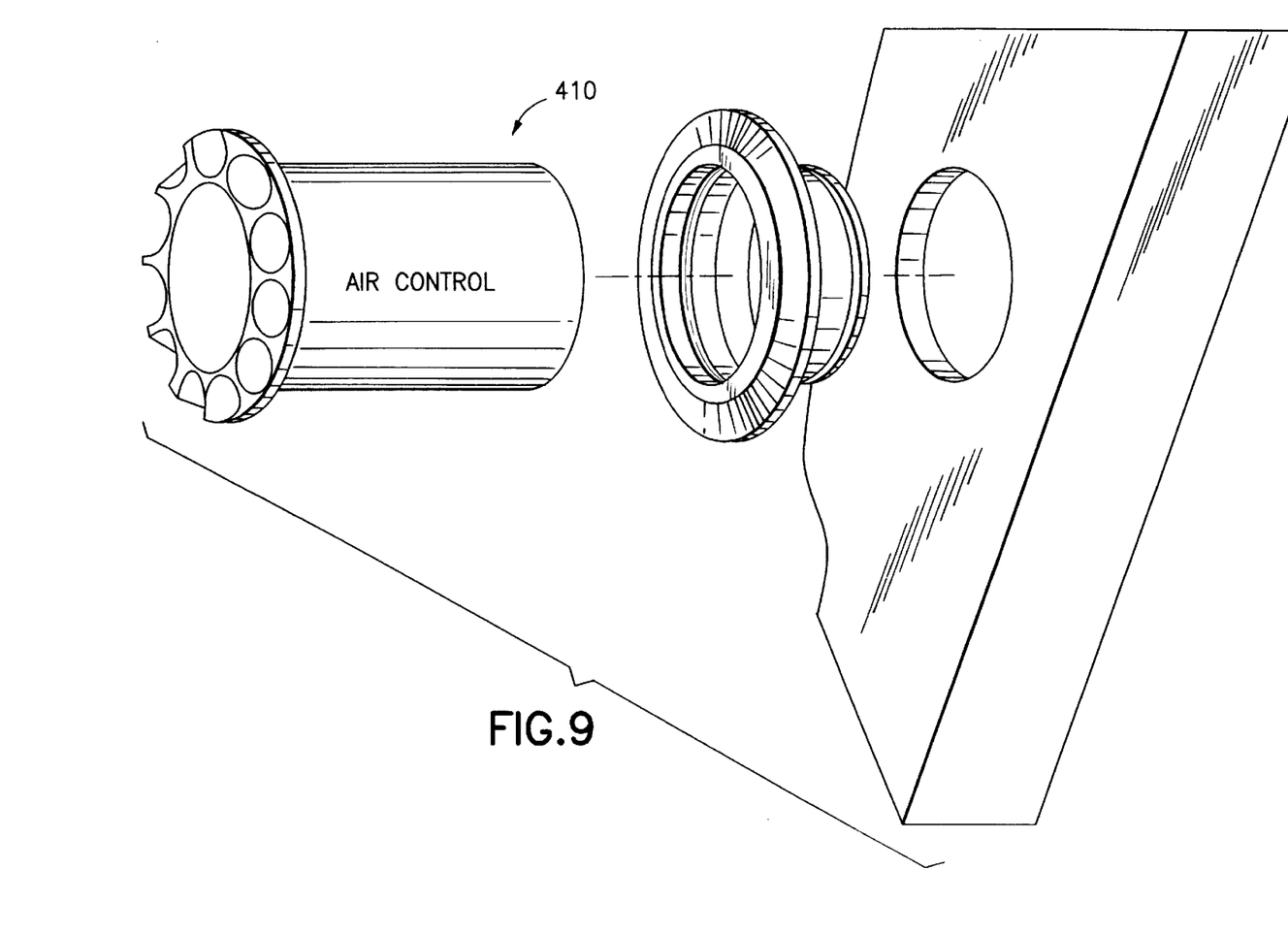
FIG. 9 is an exploded perspective view of a sixth embodiment of a tub fixture assembly according to the invention.
Figure 10:
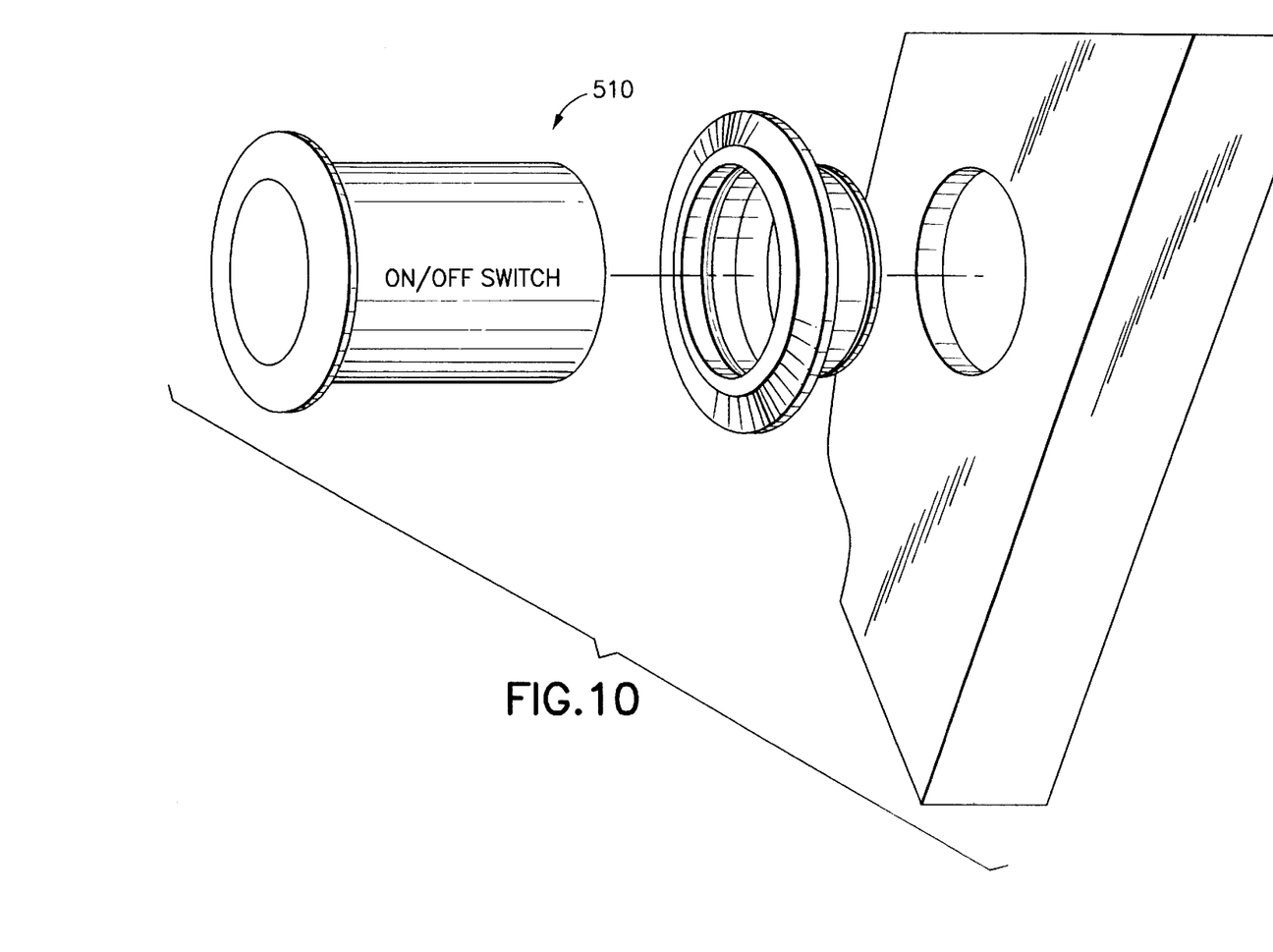
FIG. 10 is an exploded perspective view of an seventh embodiment of a tub fixture assembly according to the invention.

It will be appreciated that even other assemblies can be designed and installed in a manner similar to above. Turning to FIG. 9, for example, an air control assembly 410 is shown. Referring to FIG. 10, a power switch assembly 510 is shown.

It will be further appreciated that a round fixture and round grommet may be undesirable for some fixture assemblies and that, in place, a rectangular fixture can be used with a rectangular grommet. For example, turning to FIG. 11, a skim filter assembly 610 includes a rectangular wall grommet 612 and a skim filter 614. The rectangular wall grommet 612 includes a lip 616 and a body portion 618 provided with an internal raised bead 619. The skim filter 614 includes an inlet lip 620, an elbow portion 622 having a 90° bend and provided with an external groove 623, and an elongate rectangular tubular portion 624 having a width and height relatively smaller than the elbow portion 622. The exterior height and width of the elbow portion 622 are sized relative to the interior height and width of the body portion 618 of the wall grommet 612 such that when the elbow portion is inserted into the body portion, the elbow portion compresses the body portion to form a watertight seal.

Figure 11:
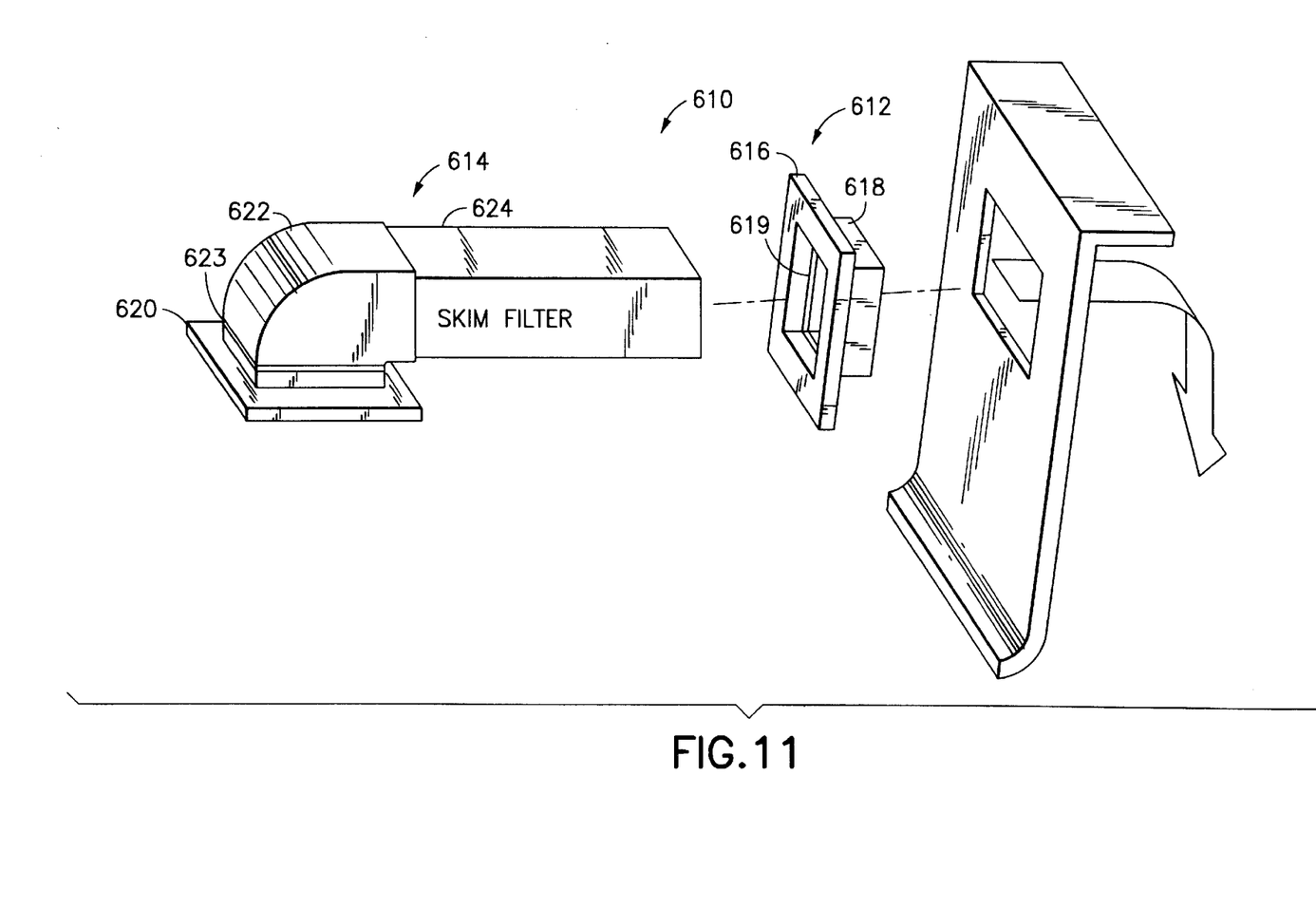
FIG. 11 is an exploded perspective view of a eighth embodiment of a tub fixture assembly according to the invention.
Figure 12:
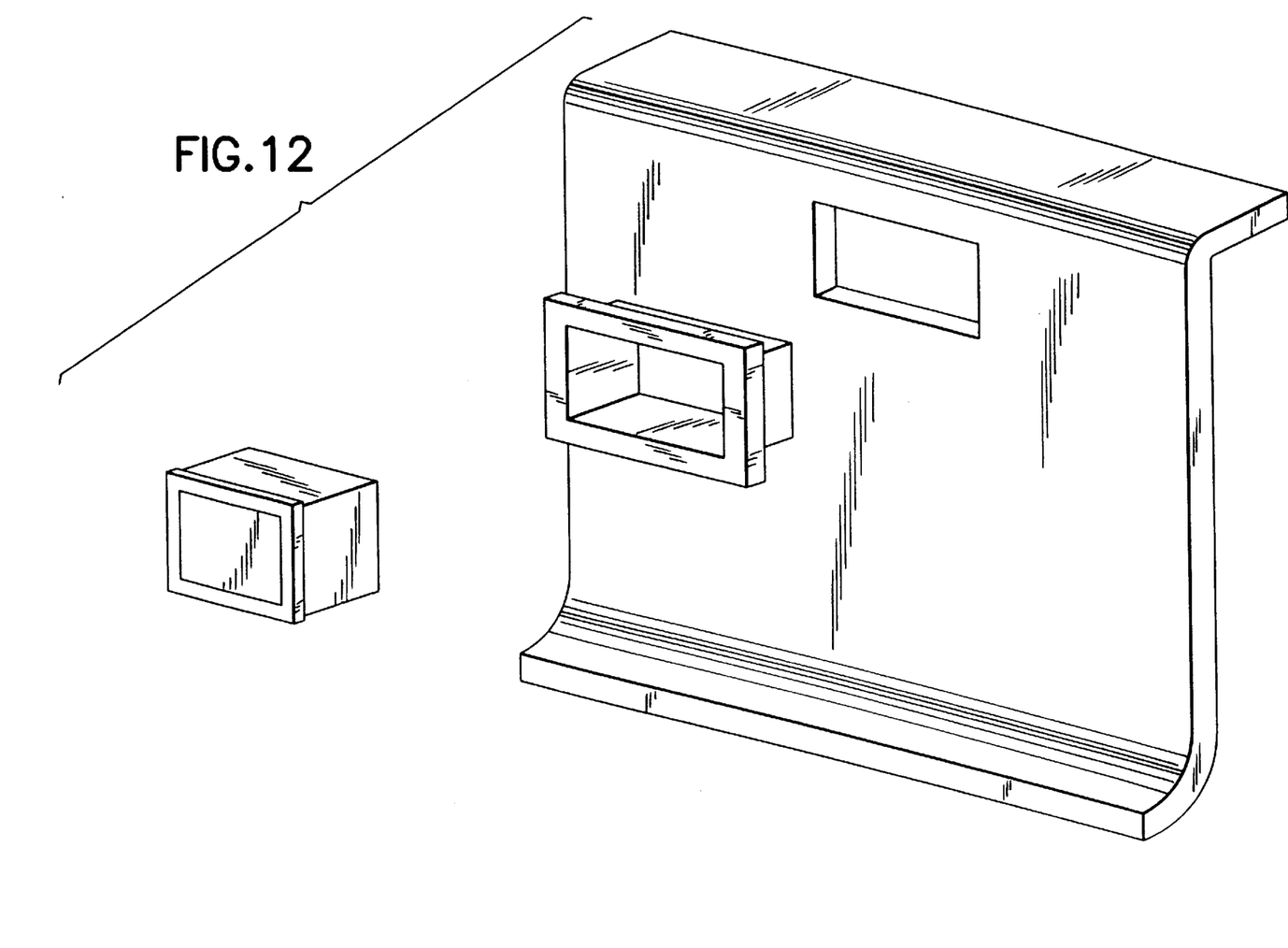
FIG. 12 is an exploded perspective view of a ninth embodiment of a tub fixture assembly according to the invention.

In installation, the wall grommet is seated flush in a rectangular cutout in a pool or tub wall. The tubular portion is freely inserted through the wall grommet until reaching the elbow portion. The skim filter is then angled by 90° through the wall grommet until the inlet lip 620 is flush with the lip 616 of the wall grommet and the bead 619 and groove 623 interlock. Referring to FIG. 12, a watertight lighting fixture assembly is likewise provided, designed along a similar basis as the skim filter.

There have been described and illustrated herein several embodiments of a hydrotherapy jet assembly fixture and other hot tub and pool fixtures, and a method of installing the same. While several embodiments of the invention have been described, it is not intended that the invention be limited thereto, as it is intended that the invention be as broad in scope as the art will allow and that the specification be read likewise. Thus, while particular fixtures have been disclosed for illustrative purposes, it will be appreciated that other fixtures for a tub or pool could likewise be designed. Furthermore, while the bead has been disclosed in illustration to appear unbroken, it will be appreciated that the bead may be discontinuous. Moreover, while round and rectangular fixtures assemblies have been disclosed, it will be appreciated that other shapes may also be provided. For example, a triangular or octagonal fixture in a triangular or octagonal grommet. With respect to the hydrotherapy jet assembly embodiment, while the jet valve body has been disclosed as having internal threads for locking with a jet insert, it will be appreciated that other locking means may be used for this purpose, i.e., a snap fit assembly. In addition, while a water fitting and a nozzle coupling have been shown to have an approximately 90° bend, it will be recognized that the preferable angle for the elbow joint of the water fitting or nozzle coupling will best be determined by the location of the water hose relative to the water fitting or nozzle coupling in a particular installation. Moreover, it will be appreciated that the air conduit and the check valve may be interchangeably used in the various embodiments of the hydrotherapy jet assembly. Furthermore, while glue, another sealant, or a coupling grommet have been disclosed for sealing the water fitting or the nozzle coupling to the jet valve body, it will be understood that any means which provides a watertight seal at the junction of the two components can be similarly used. It will therefore be appreciated by those skilled in the art that yet other modifications could be made to the provided invention without deviating from its spirit and scope as so claimed.

We claim:

1. A watertight spa let fixture assembly for installation in a hole in a tub wall or a pool wall, comprising:

a) a resilient wall grommet having an outer surface sized to permit said wall grommet to be inserted into the hole, an inner surface, and first and second ends, said first end having a lip sized greater than said outer surface of said wall grommet which prevents said wall grommet from passing completely through the hole; and b) a jet valve body means for receiving a jet valve insert, said jet valve body means having an outer surface sized to permit said jet valve body means to be inserted into said wall grommet and compress said wall grommet to form a watertight seal between said jet valve body means and the wall, means for preventing said jet valve body means from passing completely through said wall grommet, a first water conduit means for receiving water, an air inlet means for receiving air, said air inlet means being distinct from said first water conduit means, and nozzle means for mixing the water and air into an aerated water mixture.

2. A spa jet fixture assembly according to claim 1, wherein:

said inner surface of said wall grommet is tapered adjacent said second end.

3. A fixture assembly according to claim 1, wherein:

said air inlet means is a check valve.

4. A spa jet fixture assembly according to claim 1, wherein:

said jet valve body means is substantially tubular and has a graduated diameter.

5. A spa jet fixture assembly according to claim 1, further comprising:

c) a resilient substantially tubular coupling grommet having a first end and a second end, an inner diameter and an outer diameter, and means for preventing said coupling grommet from passing through said first water conduit, said first end inserted into said first water conduit and said second end coupled to a second water conduit.

6. A spa jet fixture assembly according to claim 5, wherein:

said inner diameter tapers toward said first end.

7. A spa jet fixture assembly according to claim 1, wherein:

said wall grommet is provided with one of a raised bead and a groove along said inner surface and said outer surface of said jet valve body means is provided with the other of a raised bead and a groove along said outer surface of said jet valve body means, such that when said jet valve body means is seated in said wall grommet said bead interlocks with said groove.

8. A fixture assembly according to claim 7, wherein:

said air inlet means is a tubular conduit exiting said jet valve body parallel to said first water conduit.

9. A fixture assembly according to claim 7, wherein:

said air inlet means is a check valve.

10. A spa jet fixture assembly according to claim 1, wherein:

said outer surface of said grommet has a substantially constant outer diameter between said lip at said first end and said second end.

11. A fixture assembly for installation in a hole in a tub wall or a pool wall, comprising:

a) a resilient wall grommet having an outer surface sized to permit said wall grommet to be inserted into the hole, an inner surface, and means for preventing said wall grommet from passing completely through the hole; and b) a fixture having an outer surface sized to permit said fixture to be inserted into said wall grommet and compress said wall grommet to form a watertight seal between said fixture and the wall, and means for preventing said fixture from passing completely through said wall grommet; and c) a nozzle coupling means for coupling said fixture to an air supply means and a water supply means, said nozzle coupling means having a water conduit, an air conduit, a nozzle, and an outlet, said outlet fit over said outer surface of said wall grommet, wherein when water flows through said water conduit through said nozzle, the water expands in said nozzle and mixes with air drawn in through the air conduit.

12. A spa jet fixture assembly according to claim 11, wherein:

said outer surface of said wall grommet is provided with one of a raised bead and a groove and said outlet is internally provided with the other of a raised bead and a groove, wherein when said outlet is fit over said wall grommet, said raised bead interlocks with said groove.

* * * * *

UNITED STATES PATENT AND TRADEMARK OFFICE
CERTIFICATE OF CORRECTION

PATENT NO. : 5,850,640
DATED : December 22, 1998
INVENTOR(S) : John Pinciaro It is certified that error appears in the above-identified patent and that said Letters Patent is hereby corrected as shown below:

Column 7,
Line 64, change "let" to -- jet --.

Signed and Sealed this

Second Day of August, 2005

JON W. DUDAS
*Director of the United States Patent and Trademark Office*